United States Patent [19]

Kageyama

[11] Patent Number: 4,865,405
[45] Date of Patent: Sep. 12, 1989

[54] OPTICAL FILTER

[75] Inventor: Hitoshi Kageyama, Osaka, Japan

[73] Assignee: Minolta Camera Kabushiki Kaisha, Osaka, Japan

[21] Appl. No.: 282,259

[22] Filed: Dec. 9, 1988

[30] Foreign Application Priority Data

Dec. 10, 1987 [JP] Japan .................................. 62-313330

[51] Int. Cl.$^4$ .............................................. G02B 1/10
[52] U.S. Cl. ..................................... 350/1.6; 350/1.1; 350/164
[58] Field of Search ................... 350/1.1, 1.6, 164, 166

[56] References Cited

U.S. PATENT DOCUMENTS

| 2,403,685 | 7/1946 | Sachtleben et al. | 350/166 |
| 2,742,819 | 4/1956 | Koch et al. | 350/166 |
| 4,461,532 | 7/1984 | Sato et al. | 350/166 |
| 4,659,178 | 4/1987 | Kyogoku | 350/166 |

FOREIGN PATENT DOCUMENTS 56-62269 5/1981 Japan .
59-195205 11/1984 Japan .

Primary Examiner—Bruce Y. Arnold
Assistant Examiner—Terry S. Callaghan
Attorney, Agent, or Firm—Price, Gess & Ubell

[57] ABSTRACT

An optical filter used for a color image reader in order to adjust each amount of red, green and blue rays into constant ratio and to cutoff the rays of the near infrared radiation, the optical filter having a heat absorbing optical glass substrate and first and second interference films formed on the opposite sides of the substrates. The first interference film has three to eleven layers wherein a first layer immediately adjacent to the substrate has an optical thickness of $\lambda/4$ or $\lambda/8$ and a last layer farthest from the substrate has an optical thickness of $\lambda/8$, and said second interference film has thirteen to twenty-three layers wherein each of a first layer, second layer and third layer formed closest to the substrate in this order has an optical thickness greater than $\lambda/4$ and a last layer farthest from the substrate has an optical thickness of $\lambda/8$.

6 Claims, 3 Drawing Sheets

OPTICAL FILTER

BACKGROUND OF THE INVENTION

1. Field of the Invention

The present invention relates to an optical filter used for a color image reader or the like, and more particularly to an optical filter capable of eliminating noise caused by a near infrared radiation during a color image reading to thereby adjust an amount of red rays, green rays and blue rays by a single filter.

2. Description of the Related Arts

A color sensor provided at a color image reader for receiving a reflection light from a color document, which is irradiated with light from a light source, i.e., a halogen lamp, to thereby obtain color data of the document, has light receiving portions corresponding to each color of red, green and blue. These light receiving portions respectively have a spectral sensitivity shown in FIG. 1. The color sensor senses each ray of three colors, i.e., red (R), green (G) and blue (B) and reads a ratio of amount of each ray, red, green and blue reflected from the document, obtaining color data of the document.

Actually, the spectral sensitivity curve of the color sensor shown in FIG. 1 shows that the blue rays B and green rays G have sensitivity at the level toward the long wavelength from the wavelength of 650 nm. Therefore, the color sensor senses both the red rays R and the near infrared radiation at the level toward the long wavelength from the wavelength of 650 nm as a blue ray B and green ray G, with the result that the accurate color data cannot be obtained.

Further, each element corresponding to each ray of red R, green G and blue B has different sensitivity as shown in FIG. 1. In addition, the halogen lamp as a light source has no flat spectral intensity with respect to red, green and blue. Specifically, it has a spectral intensity satisfying the following equation of $B<G<R$. Consequently, the color sensor cannot determine that the reflection light from a blank document having a ratio of R:G:B of 1:1:1 satisfies the equation of $R:G:B=1:1:1$, making it difficult to obtain the accurate color data.

SUMMARY OF THE INVENTION

A main object of the present invention is to provide an optical filter which does not transmit light having a wavelength of 650 nm to 1200 nm and which is capable of adjusting each amount of red ray, green ray and blue ray in accordance with spectral intensity of a light source and spectral sensitivity of a color sensor.

These and other objects of the invention can be accomplished by providing an optical filter comprising a substrate of a heat absorbing optical glass which is sandwiched between first and second interference films, said first interference film having three to eleven layers wherein a first layer immediately adjacent to the substrate has an optical thickness of $\lambda_0/4$ or $\lambda_0/8$ and a last layer farthest from the substrate has an optical thickness of $\lambda_0/8$, and said second interference film having thirteen to twenty-three layers wherein each of a first layer, second layer and third layer formed closest to the substrate in this order has an optical thickness greater than $\lambda_1/4$ and a last layer farthest from the substrate has an optical thickness of $\lambda_1/8$.

These and other objects or features of the present invention will become apparent from the following description of the preferred embodiments thereof taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
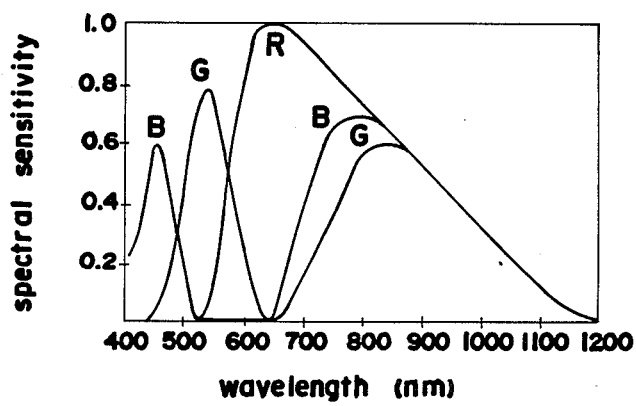
FIG. 1 is a graph showing a spectral sensitivity of a conventional color filter.
Figure 2:
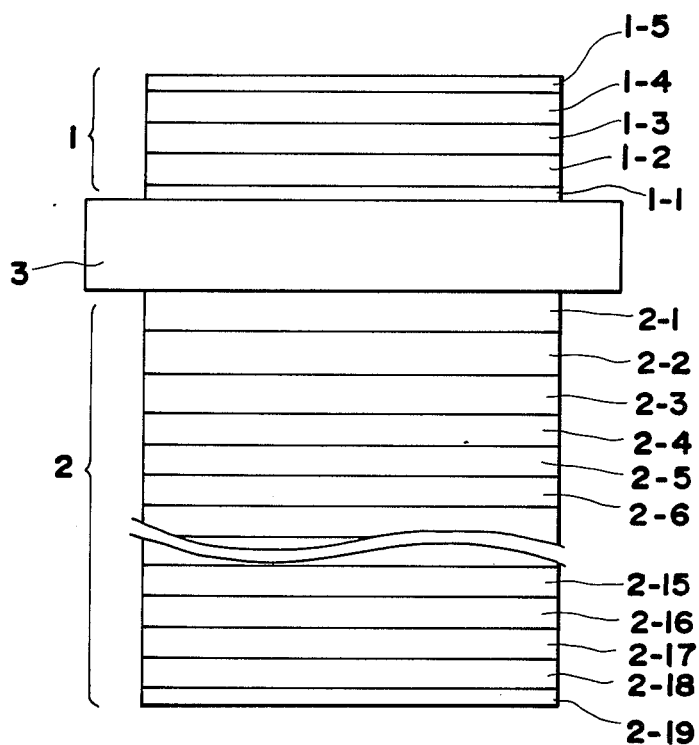
FIG. 2 is a sectional view showing an optical filter of the present invention.
Figure 3:
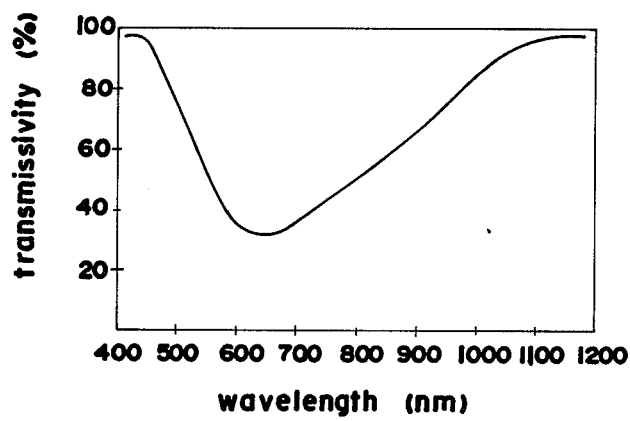
FIG. 3 is a graph showing a spectral transmissivity of an interference film 1.

A preferred embodiment of the present invention will be explained hereinbelow with respect to the drawings. FIG. 2 is a sectional view showing an optical filter of the present invention. The optical filter comprises a substrate 3 of a heat absorbing optical glass sandwiched between interference films 1 and 2. As shown in FIG. 2, the interference film 1 is composed of a plurality of layers in which a low refractive index layer and a high refractive index layer are alternately superimposed. Each of the low refractive index layer and high refractive index layer is dielectric. For example, it may be better to use an interference film having a spectral transmissivity shown in FIG. 3 as the interference film 1, since said interference film has a transmissivity fulfilling the equation of $B>G>R$.

The reduction rate of the transmissivity of each ray R, G and B should be set considering the spectral intensity of the halogen lamp and the spectral sensitivity of the color sensor. However, this rate can be controlled by the number of superimposed layers and the wavelength used for designing the filter as well as optical thicknesses of the high refractive index layers and low refractive index layers. In general, it is better to superimpose three to eleven layers.

Table 1 shows an example of the construction of the interference film 1. $TiO_2$ is used as a high refractive index layer and $SiO_2$ as a low refractive index layer. The symbol $\lambda_0$ represents a wavelength used for designing the filter.

TABLE 1

| layer | Substance | refractive index | optical thickness |
|---|---|---|---|
| Substrate | heat absorbing optical glass | 1.52 | |
| 1-1 | $SiO_2$ | 1.46 | $\lambda_0/8$ |
| 1-2 | $TiO_2$ | 2.35 | $\lambda_0/4$ |
| 1-3 | $SiO_2$ | 1.46 | $\lambda_0/4$ |
| 1-4 | $TiO_2$ | 2.35 | $\lambda_0/4$ |
| 1-5 | $SiO_2$ | 1.46 | $\lambda_0/8$ |
| atmosphere | | | |
| | | | $\lambda_0 = 550$ nm |

Although the optical thickness of the first layer 1-1 is set to $\lambda_0/8$ in Table 1, it may be set to $\lambda_0/4$.

Figure 4:
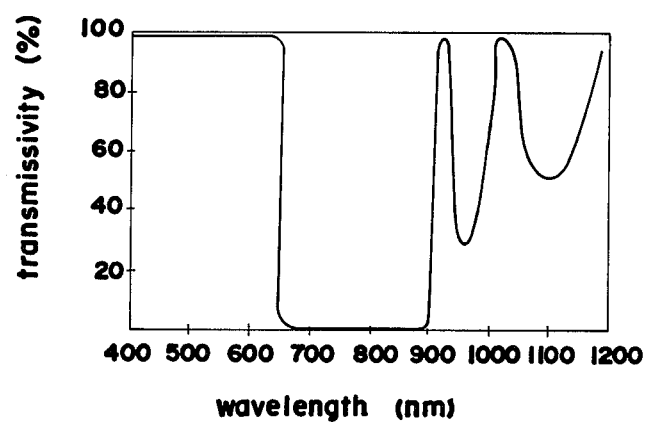
FIG. 4 is a graph showing a spectral transmissivity of an interference film 2.

The interference film 2 is provided for preventing the transmission of light at the level toward the long wavelength from the wavelength of 650 nm. FIG. 4 is a graph showing a spectral transmissivity of the interference film 2. The interference film having such a spectral transmissivity can be obtained by alternately laminating the high refractive index layers and low refractive index layers. Table 2 shows an example of the construction of the interference film 2. $TiO_2$ is used as a high refractive index layer and $SiO_2$ as a low refractive index layer. The symbol $\lambda_1$ represents a wavelength used for designing the filter.

TABLE 2

| layer | Substance | refractive index | optical thickness |
|---|---|---|---|
| Substrate | heat absorbing optical glass | 1.52 | |
| 2-1 | $SiO_2$ | 1.46 | $1.16 \times \lambda_1/4$ |
| 2-2 | $TiO_2$ | 2.35 | $1.16 \times \lambda_1/4$ |
| 2-3 | $SiO_2$ | 1.46 | $1.16 \times \lambda_1/4$ |
| 2-4 | $TiO_2$ | 2.35 | $\lambda_1/4$ |
| 2-5 | $SiO_2$ | 1.46 | $\lambda_1/4$ |
| 2-6 | $TiO_2$ | 2.35 | $\lambda_1/4$ |
| 2-7 | $SiO_2$ | 1.46 | $\lambda_1/4$ |
| 2-8 | $TiO_2$ | 2.35 | $\lambda_1/4$ |
| 2-9 | $SiO_2$ | 1.46 | $\lambda_1/4$ |
| 2-10 | $TiO_2$ | 2.35 | $\lambda_1/4$ |
| 2-11 | $SiO_2$ | 1.46 | $\lambda_1/4$ |
| 2-12 | $TiO_2$ | 2.35 | $\lambda_1/4$ |
| 2-13 | $SiO_2$ | 1.46 | $\lambda_1/4$ |
| 2-14 | $TiO_2$ | 2.35 | $\lambda_1/4$ |
| 2-15 | $SiO_2$ | 1.46 | $\lambda_1/4$ |
| 2-16 | $TiO_2$ | 2.35 | $\lambda_1/4$ |
| 2-17 | $SiO_2$ | 1.46 | $\lambda_1/4$ |
| 2-18 | $TiO_2$ | 2.35 | $\lambda_1/4$ |
| 2-19 | $SiO_2$ | 1.46 | $\lambda_1/8$ |
| atmosphere | | | |
| | | | $\lambda_1 = 745$ nm |

Each of three layers 2-1, 2-2 and 2-3 has an optical thickness greater than $\lambda_1/4$ in order to prevent the generation of ripple of the spectral transmissivity at the region where the light having a wavelength shorter than 650 nm is transmitted. The generation of ripple at this region makes it difficult to control each amount of red rays R, green rays G and blue rays B, thereby undesirable. The interference film 2 having the spectral transmissivity shown in FIG. 4 can be obtained by alternately superimposing the high refractive index layers and low refractive index layers as mentioned above, it being desirable to superimpose thirteen to twenty-three layers. If the interference film 2 has twelve layers or less, the wavelength cannot sharply be selected at the lower limit of the band, i.e., at 650 nm. The interference film 2 having twenty-four layers or more has a difficulty in eliminating ripple at the region where the light having a wavelength of 400 to 650 nm is transmitted.

As apparent from FIG. 4, the interference film 2 prevents the transmission of light having a wavelength of 650 nm to 900 nm. However, the color sensor is capable of sensing a light having a wavelength of about 1200 nm, resulting in that only an interference film 2 is insufficient. The region of the interference film 2 where the light is not transmitted can be widened by enlarging a ratio H/L of the refractive index H of the high refractive index layer and the refractive index L of the low refractive index layer. However, there are no materials at present to afford the ratio H/L for preventing light having a wavelength of 650 nm to 1200 nm from transmitting.

Figure 5:
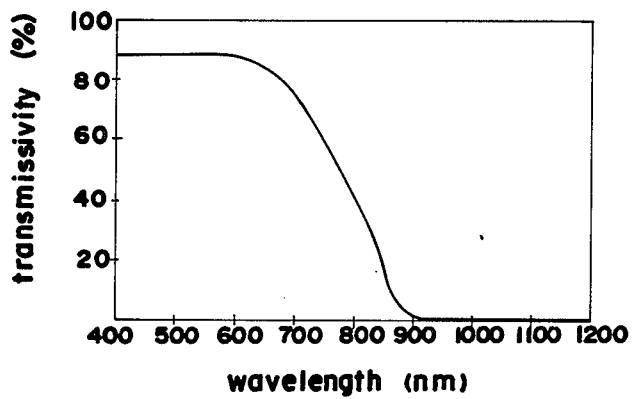
FIG. 5 is a graph showing a spectral transmissivity of a substrate.

In view of this, the present invention employs the substrate 3 of a heat absorbing optical glass in order not to transmit the light having a wavelength of 900 nm to 1200 nm. FIG. 5 shows a graph of spectral transmissivity of this heat absorbing optical glass.

Besides $TiO_2$, ZnS (refractive index is 2.3) can be used as a high refractive index layer. Examples of materials used for a low refractive index layer are $Al_2O_3$ (refractive index is 1.58), $MgF_2$ (refractive index is 1.38) or the like in addition to $SiO_2$.

Figure 6:
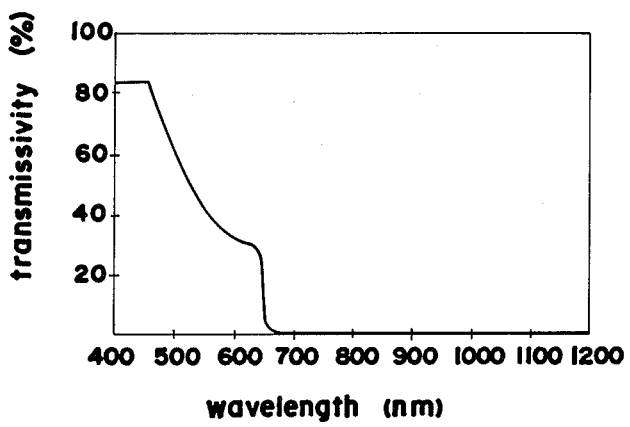
FIG. 6 is a graph showing a spectral transmissivity of an optical filter of the present invention.

As described above, the optical filter of the present invention has the substrate 3 of a heat absorbing optical glass which is sandwiched between two kinds of the interference films 1 and 2. Therefore, the inconvenience of the color sensor can be eliminated by a single optical filter. FIG. 6 shows the spectral transmissivity of the optical filter according to the present embodiment.

The optical filter of the present invention is capable of eliminating noise to the blue rays and green rays, said noise being given by light having a wavelength of 650 nm to 1200 nm. Further, the present invention can correct an inaccurate color data attributable to the irregularities in photosensitivity of red, green and blue as well as the irregularities in spectral intensity of the light source with only a single optical filter.

Although the present invention has been fully described by way of examples with reference to the accompanying the drawings, it is to be noted that various changes and modifications will be apparent to those skilled in the art. Therefore, unless otherwise such changes and modifications depart from the scope of the present invention, they should be construed as being included therein.

What is claimed is:

1. An optical filter used for a color image reader or the like comprising a substrate of a heat absorbing optical glass which is sandwiched between first and second interference films, said first interference film having three to eleven layers wherein a first layer immediately adjacent to the substrate has an optical thickness of $\lambda_0/4$ or $\lambda_0/8$ and a last layer farthest from the substrate has an optical thickness of $\lambda_0/8$, where $\lambda_0$ is a first design wavelength, and said second interference film having thirteen to twenty-three layers wherein each of a first layer, second layer and third layer formed closest to the substrate in this order has an optical thickness greater than $\lambda_1/4$ and a last layer farthest from the substrate has an optical thickness of $\lambda_1/8$ where $\lambda_0$ is a second design wavelength.

2. An optical filter as claimed in claim 1, wherein the intermediate layers of the first and second interference films have optical thicknesses of $\lambda_0/4$ and $\lambda_1/4$, respectively.

3. An optical filter used for a color image reader or the like comprising:
   a substrate of a heat absorbing optical glass;
   first interference film formed on one side of the substrate, said first interference film having three to eleven dielectric layers wherein a first layer immediately adjacent to the substrate and a last layer farthest therefrom have an optical thickness of $\lambda_0/8$ respectively and each of other layers has an optical thickness of $\lambda_0/4$ where $\lambda_0$ is a first design wavelength; and
   second interference film formed on another side of the substrate, said second interference film having thirteen to twenty-three layers wherein each of a first, second and third layers formed closest to the substrate in this order has an optical thickness greater than $\lambda_1/4$, a last layer farthest from the substrate has an optical thickness of $\lambda_1/8$, and each of other layers has an optical thickness of $\lambda_1/4$, where $\lambda_1$ is a second design wavelength.

4. An optical filter as claimed in claim 3, wherein the first, second and third layers of the second interference film have an optical thickness of $1.16 \times \lambda_1/4$ respectively.

5. An optical filter used for a color image reader or the like comprising:

a substrate of a heat absorbing optical glass;

first interference film formed on one side of the substrate, said first interference film having three to eleven dielectric layers wherein a last layer farthest therefrom has an optical thickness of $\lambda_0/8$ and each of other layers has an optical thickness of $\lambda_0/4$ where $\lambda_0$ is a first design wavelength; and second interference film formed on another side of the substrate, said second interference film having thirteen to twenty-three layers wherein each of a first, second and third layers formed closest to the substrate in this order has an optical thickness greater than $\lambda_1/4$, a last layer farthest from the substrate has an optical thickness of $\lambda_1/8$, and each of other layers has an optical thickness of $\lambda_1/4$, where $\lambda_1$ is a second design wavelength.

6. An optical filter as claimed in claim 5, wherein the first, second and third layers of the second interference film have an optical thickness of $1.16 \times \lambda_1/4$ respectively.

* * * * *